United States Patent [19]

Griffith et al.

[11] Patent Number: 4,717,487

[45] Date of Patent: Jan. 5, 1988

[54] PROCESS FOR THE PREPARATION OF ASBESTIFORM CRYSTALLINE CALCIUM SODIUM METAPHOSPHATE FIBER

[75] Inventors: Edward J. Griffith, Manchester; John R. Jany, Ellisville; Vaidy R. Nathan, St. Louis; Toan M. Ngo, Eureka, all of Mo.

[73] Assignee: Monsanto Company, St. Louis, Mo.

[21] Appl. No.: 938,943

[22] Filed: Dec. 8, 1986

[51] Int. Cl.$^4$ .............................................. C01B 25/30
[52] U.S. Cl. ........................................ 252/1; 423/306
[58] Field of Search .................... 252/1; 423/306, 314

[56] References Cited

U.S. PATENT DOCUMENTS 4,346,028  8/1952  Griffith ............................... 524/417

Primary Examiner—John Doll
Assistant Examiner—Wayne A. Langel
Attorney, Agent, or Firm—Wendell W. Brooks; A. E. Hoffman; Arnold H. Cole

[57] ABSTRACT

Asbestiform crystalline calcium sodium metaphosphate fiber is prepared by (a) forming a wet mix slurry having a composition on a dry basis equivalent to a CaO/Na$_2$O/P$_2$O$_5$ mol percent ratio of about 24.0–34.0/12.0–18.0/50.0–60.0, with the proviso that the CaO/Na$_2$O mol ratio is from about 1.60 to about 2.00, (b) forming and growing product crystals of calcium sodium metaphosphate under crystal formation and growth conditions between the solid phase of the wet mix slurry and substrate crystals of calcium sodium metaphosphate, and (c) fiberizing the product crystals of calcium sodium metaphosphate.

18 Claims, No Drawings

PROCESS FOR THE PREPARATION OF ASBESTIFORM CRYSTALLINE CALCIUM SODIUM METAPHOSPHATE FIBER

BACKGROUND OF THE INVENTION

1. Field of the Invention

This invention relates to a process for the preparation of crystalline calcium sodium metaphosphate fiber. More particularly, this invention relates to a process for the preparation of asbestiform crystalline calcium sodium metaphosphate fiber. Such fiber is characterized by having the form or appearance of asbestos and by exhibiting an average aspect ratio of at least 10, preferably at least 50, and an average diameter from about 0.5 micron ($\mu$m) to about 20 $\mu$m.

Asbestiform crystalline calcium sodium metaphosphate fiber is suitable for use as a replacement fiber in many applications which historically have employed asbestos and other durable inorganic fibers as inorganic fibrous insulation and reinforcement materials.

2. Description of the Prior Art

Numerous durable inorganic fibers—asbestos, glass fibers, for example—are used in a wide variety of applications. Common among such applications are composites with organic polymeric material such as plastics, resins, natural and synthetic elastomers, and the like. Such composites are used to make floor tiles, gaskets, brake linings, clutch facings, and numerous other objects commonly found in industry and in the home.

The use of durable inorganic fibers such as asbestos and glass fibers as the inorganic fibrous material in the aforementioned applications in general provide satisfactory performance. However, such fibrous materials also suffer from certain disadvantages. For example, many of such fibrous materials, especially asbestos, have been found to expose workers as well as the general public to a potentially serious health hazard. It has been determined that the inhalation of small asbestos fibers can result in a disease known as asbestosis in which these fibers accumulate in the lungs, scar lung tissue, and cause many respiratory problems. It has become increasingly clear that inhalation of asbestos fibers over an extended period of time can lead to a cancer of the lining of the lungs known as mesothelioma as well as lung cancer. Numerous other durable inorganic fibers, for example, alkali metal titanates, are also suspected of causing similar health problems among users of such fibers. In addition, many inorganic fibers are rapidly soluble in water, dilute acids or dilute alkali which limits the usefulness of such fibers.

Accordingly, there exists a great need for an inorganic fibrous material suitable for use as an insulation fiber and as a reinforcing fiber in applications requiring the presence of inorganic fibrous materials which are not rapidly soluble in water, dilute acid or dilute alkali, and which do not present an undue health hazard to those exposed to such materials. Asbestiform crystalline calcium sodium metaphosphate fiber satisfies each of these requirements.

A unique feature of asbestiform crystalline calcium sodium metaphosphate fiber is the presence of a polyphosphate backbone which is believed to account for the lack of an undue health hazard to those exposed to such fiber. Polyphosphate chains, of course, are known to be biodegradable. As such, it is believed that, in contrast to durable inorganic fibers, biodegradation by enzyme-assisted hydrolysis of the polyphosphate backbone of asbestiform crystalline calcium sodium metaphosphate fiber should occur in vivo to facilitate dissolution thereof. The resulting calcium, sodium, and inorganic phosphate can then be utilized in the normal biochemical functions of the cell.

A process to prepare asbestiform crystalline calcium sodium metaphosphate fiber is known to the art. In U.S. Pat. 4,346,028, such fiber and a process to prepare same are disclosed. The process comprises forming a melt of a source of oxygen, calcium, phosphorus, and sodium having a mol percent ratio of about 15 mol percent to about 30 mol percent sodium oxide ($Na_2O$), about 48 mol percent to about 60 mol percent phosphorus pentoxide ($P_2O_5$), and about 20 mol percent to about 37 mol percent calcium oxide (CaO), maintaining the resulting mixture at a temperature below the melting point of the calcium sodium metaphosphate for a time sufficient to form blocks of calcium sodium metaphosphate, and fiberizing the blocks into asbestiform crystalline calcium sodium metaphosphate fiber.

Although asbestiform crystalline calcium sodium metaphosphate fiber prepared by the process of the prior art is effective for contemplated end use applications, a process which can be readily adapted for batch, semicontinuous, or continuous operations would provide for increased efficiency in any commercial scale operation. Accordingly, research efforts are continually being made to define new or improved processes to more efficiently prepare asbestiform crystalline calcium sodium metaphosphate fiber. The discovery of the process of the instant invention provides such a process and, therefore, is believed to be a decided advance in the asbestiform crystalline calcium sodium metaphosphate fiber art.

SUMMARY OF THE INVENTION

It is an object of this invention to provide a process for the preparation of asbestiform crystalline calcium sodium metaphosphate fiber which can be adapted to batch, semicontinuous, and continuous operations.

Another object of this invention is to provide a process for the preparation of asbestiform crystalline calcium sodium metaphosphate fiber characterized by exhibiting an aspect ratio of at least 10, preferably at least 50, and an average diameter from about 0.5 $\mu$m to about 20 $\mu$m.

To achieve these and other objects, together with the advantages thereof, which will become apparent from the accompanying description and claims, a process is provided for the preparation of asbestiform crystalline calcium sodium metaphosphate fiber, which process comprises:

(a) bringing together in aqueous media source materials for CaO, $Na_2O$, and $P_2O_5$ in proportions sufficient to provide a CaO/$Na_2O$/$P_2O_5$ mol percent ratio on a dry basis of about 24.0–34.0/12.0–18.0/50.0–60.0, with the proviso that the CaO/$Na_2O$ mol ratio is from about 1.60 to about 2.00, and form a wet mix slurry containing a solid phase and an aqueous liquid phase;

(b) dispersing the wet mix slurry onto substrate calcium sodium metaphosphate crystals in a crystal formation and growth zone under conditions sufficient to remove the aqueous liquid phase and deposit the solid phase onto the substrate crystals and cause identically oriented continuous crystal formation and growth between the solid phase deposit and the substrate crystals to thereby form product crystals of calcium sodium metaphosphate; and (c) fiberizing the product crystals of calcium sodium metaphosphate into asbestiform crystalline calcium sodium metaphosphate fiber.

DESCRIPTION OF THE PREFERRED EMBODIMENTS

In accordance with this invention, a process is provided for the preparation of asbestiform crystalline calcium sodium metaphosphate fiber. Such fiber, which is suitable for use as an insulation fiber and as a reinforcing fiber in applications requiring the presence of inorganic fibrous materials, is prepared by a process which comprises:

(a) bringing together in aqueous media source materials for CaO, $Na_2O$, and $P_2O_5$ in proportions sufficient to provide a $CaO/Na_2O/P_2O_5$ mol percent ratio on a dry basis of about 24.0–34.0/12.0–18.0/50.0–60.0, with the proviso that the $CaO/Na_2O$ mol ratio is from about 1.60 to about 2.00, and form wet mix slurry containing a solid phase and an aqueous liquid phase;

(b) dispersing the wet mix slurry onto substrate calcium sodium metaphosphate crystals in a crystal formation and growth zone under conditions sufficient to remove the aqueous liquid phase and deposit the solid phase onto the substrate crystals and cause identically oriented continuous crystal formation and growth between the solid phase deposit and the substrate crystals to thereby form product crystals of calcium sodium metaphosphate; and (c) fiberizing the product crystals of calcium sodium metaphosphate into asbestiform crystalline calcium sodium metaphosphate fiber.

The asbestiform crystalline calcium sodium metaphosphate fiber is a high molecular weight phosphate $[CaNa(PO_3)_3]_n$, wherein n is a number representing the number of repeating $CaNa(PO_3)_3$ units. Fiber prepared in accordance with the process of the instant invention exhibits an aspect ratio (length-to-average diameter ratio, L/D) of at least 10, preferably at least 50, and an average diameter in the range from about 0.5 micron ($\mu m$) to about 20 $\mu m$, referably from about 1 $\mu m$ to about 10 $\mu m$.

Component source materials suitable for use in the process of the instant invention are those which yield the desired asbestiform crystalline calcium sodium metaphosphate fiber. Referring to the elemental composition of asbestiform calcium sodium metaphosphate fiber in terms of its dry basis calcium oxide (CaO)/sodium oxide ($Na_2O$)/phosphorus pentoxide ($P_2O_5$) composition equivalent, component source materials in a mol percent ratio from about 24.0 to about 34.0 CaO, from about 12.0 to about 18.0 $Na_2O$, and from about 50.0 to about 60.0 $P_2O_5$, that is, a $CaO/Na_2O/P_2O_5$ mol percent ratio of about 24.0–34.0/12.0–18.0/50.0–60.0, with the proviso that the $CaO/Na_2O$ mol ratio is from about 1.60 to 2.00, has been found to consistently yield the desired asbestiform crystalline calcium sodium metaphosphate fiber. It is preferred to use component source materials having a composition on a dry basis equivalent to a $CaO/Na_2O/P_2O_5$ mol percent ratio of about 29.0–34.0/16.0–18.0/50.0–53. and a $CaO/Na_2O$ mol ratio from about 1.80 to 2.00, with a $CaO/Na_2O/P_2O_5$ mol percent ratio of about 30.0–33.0/16.5–17.5/50.5–52.5, and the previously noted $CaO/Na_2O/$ mol ratio from about 1.80 to 2.00 being most preferred.

In general, the $CaO/Na_2O/P_2O_5$ mol percent ratio in the product crystals and, ultimately, the asbestiform calcium sodium metaphosphate fiber is determined by the $CaO/Na_2O/P_2O_5$ mol percent ratio in the wet mix slurry as charged to the crystallization kiln (crystal formation and growth zone) and dispersed upon the substrate crystals of calcium sodium metaphosphate. Typically, the average $CaO/Na_2O/P_2O_5$ mol percent ratio and the $CaO/Na_2O$ mol ratio for the product crystals and the abestiform calcium sodium metaphosphate fiber ranges from about 32.30–32.70/16.90 17.20/50.25–50.60 and about 1.80–2.00, respectively, as compared to the theoretical mol percent ratio and mol ratio of 33.33/16.67/50.00 and 2.00, thus indicating an excess of $Na_2O$ and $P_2O_5$ in the product crystals and asbestiform calcium sodium metaphosphate fiber relative to the amount of CaO.

The CaO, $Na_2O$, and $P_2O_5$ composition equivalent of the product crystals (also referred to herein as crystalline calcium sodium metaphosphate and calcium sodium metaphosphate crystals) and, as previously noted, the asbestiform crystalline calcium sodium metaphosphate fiber can be provided by any number of component source materials known to those skilled in the art so long as the stated $CaO/Na_2O/P_2O_5$ mol percent ratio and $CaO/Na_2O$ mol ratio are achieved. It is preferred, by virtue of the elemental composition of the product crystals and the asbestiform crystalline calcium sodium metaphosphate fiber to minimize the presence of anions other than carbonates, hydroxides, and phosphates, since the presence of more than trace amounts of anions such as sulfates, halides, and the like in the component source materials tends to exert an adverse effect upon the production of the product crystals. For convenience, the component source materials will be referred to herein as source material for CaO, $Na_2O$, and $P_2O_5$.

Suitable source materials for CaO include calcium phosphates and basic calcium-containing materials such as calcium carbonate, calcium oxide, calcium hydroxide, and mixtures thereof. Caloium hydroxide [Ca(OH)$_2$], also known as hydrated lime, is generally preferred in that it is readily available, can be easily mixed with the other source materials in aqueous media, and does not introduce any extraneous anions into the product.

Compounds suitable for use as the source material for $Na_2O$ include the sodium orthophosphates and condensed phosphates which contain at least one P—O—P linkage such as the metaphosphates and the pyrophosphates and the like, sodium hydroxide, sodium carbonate, and the like. For reasons similar to those stated for the preference for calcium hydroxide as the CaO source material, sodium hydroxide (NaOH) is preferred as the $Na_2O$ source material. Advantages accruing from the use of sodium hydroxide as the $Na_2O$ source material include its ready availability, its ease of mixing in aqueous media, and little, if any, undesirable foam formation during mixing operations.

Representative source materials for $P_2O_5$ include phosphorus pentoxide, orthophosphoric acid, and orthophosphate salts such as sodium dihydrogen orthophosphate, disodium hydrogen orthophosphate, trisodium orthophosphate, condensed phosphoric acids such as pyrophosphoric acid and polyphosphoric acid, and the sodium salts of condensed phosphoric acids.

Among these materials, orthophosphoric acid ($H_3PO_4$) is preferred, with 85% $H_3PO_4$ being most preferred.

Other suitable source materials for CaO, $Na_2O$, and $P_2O_5$ include any compound or mixture of compounds having a composition on a dry basis equivalent to the stated $CaO/Na_2O/P_2O_5$ mol percent ratio—calcium sodium orthophosphate and calcium sodium pyrophosphate, for example.

The purity of the source materials for CaO, $Na_2O$, and $P_2O_5$ must be such that the yield of the product crystals and, ultimately, the asbestiform crystalline calcium sodium metaphosphate fiber is not affected adversely. Advantageously, it is preferred to use reagent grade materials to control the level of undesired impurities.

The initial step to prepare the product crystals of calcium sodium metaphosphate involves bringing together the source materials for CaO, $Na_2O$, and $P_2O_5$ in proportions sufficient to provide a $CaO/Na_2O/P_2O_5$ mol percent ratio on a dry basis of about 24.0–34.0/12.0–18.0/50.0–60.0, and a $CaO/Na_2O$ mol ratio of about 1.60 to about 2.00, preferably about 29.0–34.0/16.0–18.0/50.0–53.0 and about 1.80 to about 2.00, respectively. The component source materials are mixed by slurrying in aqueous media, usually water. In general, it is preferred to employ sufficient water to provide a wet mix slurry wherein the total solids concentration (sum of the concentrations of CaO, $Na_2O$, and $P_2O_5$) is from about 40% to about 70% by weight, preferably about 45% to about 55% by weight. During the mixing operations to prepare the wet mix slurry, the aqueous mixture preferably is maintained at a temperature sufficient to prevent (or suppress) (a) foam formation, (b) excessive water loss, and (c) selective crystallization of sodium dihydrogen phosphate and calcium hydrogen phosphate, either of which could cause an adverse effect upon the $CaO/Na_2O/P_2O_5$ mol percent ratio, the $CaO/Na_2O$ mol ratio, and/or the solid phase content of the wet mix slurry. In general, a preferred temperature ranges from about 40° C. to about 95° C.

Following the formation of the $CaO/Na_2O/P_2O_5$ wet mix slurry, the wet mix slurry is dispersed onto or upon calcium sodium metaphosphate crystals which serve as a substrate upon which crystal formation and growth can occur. In a preferred embodiment, the wet mix slurry is dispersed onto substrate calcium sodium metaphosphate crystals in a crystal formation and growth zone under conditions sufficient to remove the aqueous liquid phase and deposit a solid phase layer onto the substrate crystals. During this operation, identically oriented crystal formation and growth occurs between the solid phase deposit and the substrate crystals to produce product crystals of calcium sodium metaphosphate.

It will be recognized by those skilled in the art that although the initially supplied substrate crystals provide the necessary nuclei and/or surfaces upon which the desired crystal formation and growth occurs, once subsequent crystal formation occurs, such subsequent crystals also serve to provide additional nuclei and/or surfaces for crystal formation and growth. In this manner, so long as wet mix slurry is supplied to the crystal formation and growth zone under crystal formation and growth conditions, the production of product crystals of calcium sodium metaphosphate will proceed in a continuous manner.

The crystal formation and growth conditions utilized in the instant process can vary within fairly wide limits. It will be recognized, however, that the instant process is temperature dependent in the sense that the temperature must be sufficient to cause crystal formation and growth between the solid phase deposit or layer and the substrate crystals, but, at the same time, insufficient to cause macroscale melting of either the substrate crystals or the solid phase layer. Suitable temperatures will in general range from about 550° C. to about 720° C. Preferred temperatures, however, range from about 680° C. to about 720° C., with 685° C. to about 705° C. being particularly preferred. At such preferred temperatures, the rate of product crystal production is reasonably rapid and little, if any undesirable by-product formation occurs.

It will be appreciated, however, that the particular temperature employed to produce product crystals of calcium sodium metaphosphate from a given wet mix slurry will depend to some extent upon the incipient fusion temperature of the substrate crystals and the solid phase deposit. This, in turn, will depend upon the $CaO/Na_2O/P_2O_5$ mol percent ratio on a dry basis of the wet mix slurry. For example, when the $P_2O_5$ is present in an amount which constitutes an excess of at least about 8% to about 10% on a mol percent basis above the theoretical composition equivalent of 50.00 mol percent, the crystal formation and growth process can be readily conducted at temperatures which encompass the entire operative temperature range, that is, from about 550° C. to about 720° C. On the other hand, at the preferred $CaO/Na_2O/P_2O_5$ mol percent ratio of 29.0–34.0/16.0–18.0/50.0–53.0, temperatures from about 680° C. to about 720° C. are conveniently employed. Again, however, temperatures from about 680° C. to about 720° C. are preferred, with temperatures from about 685° C. to about 705° C. being most preferred.

Thus, while not desiring to be bound by the theory of the instant invention or to limit the invention in any way, it is believed that at the previously stated temperatures incipient fusion of the substrate crystals and the solid phase deposit occurs to induce crystal formation and growth by a ripening process of continuous solid-solid dissolution and crystallization. However, regardless of the actual mechanism of the process or step by which the product crystals of calcium sodium metaphosphate are produced, the step is conveniently referred to herein as crystal formation and growth and is meant to encompass any and all possible mechanistic pathways by which the crystal formation and growth step of the instant invention occurs.

The time required for completion of the crystal formation and growth step is not narrowly critical and will depend, to some extent, upon the temperature and type of equipment employed, as well as the $CaO/Na_2O/P_2O_5$ mol percent ratio, the $CaO/Na_2O$ mol ratio, the solid phase content, and the rate of dispersion of the wet mix slurry upon the substrate crystals of calcium sodium metaphosphate. In general, however, a nominal residence time in the crystal formation and growth zone (crystallization kiln) from about 3 hours to about 15 hours, usually about 3.5 hours to about 4.5 hours, especially at the preferred temperatures, is sufficient.

The product crystals of calcium sodium metaphosphate, for convenience of handling following discharge or recovery from the crystallization kiln, are cooled to ambient (room) temperature for subsequent fiberization. The product crystals can be fiberized by conventional techniques such as grinding, crushing, levigating, triturating, milling, and the like. In general, in a preferred embodiment, the product crystals are fiberized by dry milling in an air classification mill or an air jet mill.

The instant process is suited to batch semicontinuous, or continuous operations. In a preferred embodiment, the crystal formation and growth step is carried out in a substantially horizontally oriented internally fired rotating crystallization kiln of suitable dimensions to accommodate the desired quantity of materials involved within a reasonable period of time. In addition, such kiln should comprise temperature control means and means to control the rate of addition/dispersal of the wet mix slurry into the crystal formation and growth zone of the crystallization kiln upon a preexisting bed of substrate crystals of calcium sodium metaphosphate. The resulting product crystal of calcium sodium metaphosphate (following cooling for convenience of handling) are fed into a milling apparatus for fiberization into fiber. In a semicontinuous operation, wet mix slurry is periodically charged to a wet mix slurry feed material container and dispersed upon the substrate calcium sodium metaphosphate crystals with periodic interruptions for charging the wet mix slurry feed material container and/or removing product crystals of calcium sodium metaphosphate from the crystallization kiln and/or charging the fiberizing mill. On the other hand, in a continuous operation, such periodic interruptions would be eliminated by automation.

The asbestiform crystalline calcium sodium metaphosphate fiber prepared in accordance with the process of the instant invention, as previously noted, is characterized by exhibiting an average aspect ratio of at least 10, preferably at least 50, and an average diameter in the range from about 0.5 $\mu m$ to about 20 $\mu m$, preferably from about 1 $\mu m$ to about 10 $\mu m$. Such fiber has excellent thermal stability and inertness. It is reasonably resistant to corrosion in water, dilute sodium hydroxide, and dilute hydrochloric acid.

The following specific examples illustrating the best presently-known methods of practicing this invention are described in detail in order to facilitate a clear understanding of the invention. It should be understood, however, that the detailed expositions of the application of the invention, while indicating preferred embodiments, are given by way of illustration only and are not to be construed as limiting the invention since various changes and modifications within the spirit of the invention will become apparent to those skilled in the art from this detailed description.

EXAMPLE 1

(a) Crystallization Kiln

A crystallization kiln was constructed from a 60.96 cm (24 in.) inside diameter × 121.92 cm (48 in.) long stainless steel tube, including a 5.08 cm (2 in.) long × 13.97 cm (5.5 in.) high discharge chute at each end thereof, having its longitudinal axis oriented along a substantially horizontal line and having a centrally located 33.02 cm (13 in.) circular opening in each end to accommodate required supply lines and fitted with a) a 93.98 cm (37 in.) long × 17.78 cm (7 in.) wide × 12.70 cm (5 in.) deep jacketed water-cooled line burner containing two staggered parallel rows of 14 and 13 blast burner tips spaced 6.096 cm (2.4 in.) apart, center-to-center, and having a maximum firing rate of $1.90 \times 10^9$ joules/hr (J/hr, $1.8 \times 10^6$ BTU/hr) of full ratio gas-air mixture at a maximum pressure of $2.49 \times 10^3$ pascals (P, 10 in. column of water) which was positioned in the upper quadrant of the crystallization kiln shell with its length parallel to the axis of rotation of the shell and the burner tips directed in the direction of rotation of the kiln shell on a 45° angle from the horizontal and vertical axes into the diagonally located lower quadrant of the kiln shell; (b) a 71.12 cm (28 in.) long × 2.54 cm (1 in.) inside diameter jacketed water-cooled stainless steel thermocouple assembly having four perpendicularly oriented Hastelloy C-276 tipped thermowell arms (non-jacketed tips) at equally spaced intervals along its length [to provide temperature reading and control for each of four equally divided imaginary zones Z1-Z4 of the crystallization kiln shell (numbering sequentially from one end of the kiln shell to the other), one thermocouple for each numbered zone] which was positioned parallel to and just below the line burner to coincide with the 91.44 cm (36 in.) flame zone with the thermowell arms being curved in the direction of rotation of the crystallization kiln shell to run along the kiln shell wall, but spaced from the kiln shell wall at a distance slightly greater than the distance defined by the kiln shell wall and the boring/scraper bar described in Part (d) below; (c) 91.44 cm (36 in.) long × 2.54 cm (1 in.) jacketed water-cooled stainless steel feed tube assembly containing seven 0.635 cm (0.25 in.) feed tubes numbered F1-F7 branched off perpendicular to the lengthwise axis of the assembly, all in the same direction, at equally spaced intervals along the length of the assembly and fitted with seven solenoid valves (located externally to the kiln), each associated with a particular feed tube to control the flow of feed material through the assembly, which was positioned parallel to the line burner in the upper quadrant of the annular opening of the kiln shell opposite that of the line burner to coincide with the 91.44-cm (36-in.) flame zone of the line burner and deposit the feed material directly into the flame zone; (d) a 116.84 cm (46 in.) long × 10.16 cm (4 in.) × 1.27 cm (0.5 in.) thick Hastelloy C-276 bar having 1.905 cm × 1.905 cm (0.75 in. × 0.75 in.) notches spaced 1.905 cm (0.75 in.) edge-to-edge along its length on one edge thereof which was positioned parallel to the line burner and supported by adjustable brackets attached to the underside of the line burner such that the notched side of the boring/scraper bar approached the inner wall of the kiln shell [usually about 1.905 cm (0.75 in.) at the apogee (peaks) of the notches and about 3.81 cm (1.5 in.) at the perigee (valleys) of the notches] from the side of the line burner opposite that with the burner tips; and (e) a motor driven rotation drive.

(b) Wet Mix Slurry

To 204.5 kg ($2.56 \times 10^3$ moles) of 50% by weight aqueous sodium hydroxide (NaOH) contained in a 600 l stainless steel recirculating slurry tank was added, with stirring and recirculation, 204.5 kg ($2.69 \times 10^3$ moles) of calcium hydroxide[Ca(OH)$_2$] and enough water [approximately 300 kg ($1.67 \times 10^4$ moles] to maintain an even consistency to yield a homogeneous slurry. The slurry was thereafter added, with stirring and recirculation, to 1020.7 kg ($8.85 \times 10^3$ moles) of 85% aqueous orthophosphoric acid (H$_3$PO$_4$) contained in a 1300 l stainless steel tank fitted with circulating water-cooled coils at a rate sufficient to maintain the temperature between 40° C. and 95° C. Following complete mixing, the mixture was sampled and the CaO/Na$_2$O/P$_2$O$_5$ mol percent ratio was adjusted by the addition of an additional 33.9 kg ($4.24 \times 10^2$ moles) of 50% by weight aqueous NaOH, 9.0 kg ($1.18 \times 10^2$ moles) of Ca(OH)$_2$, and 34.7 kg ($3.01 \times 10^2$ moles) of 85% aqueous H$_3$PO$_4$, while maintaining the temperature between 40° C. and 95° C. The total source material usage was 213.5 kg ($2.81 \times 10^3$ moles) of Ca(OH)$_2$, 238.4 kg ($2.98 \times 10^3$ moles) of 50% by weight aqueous NaOH, and 1055.4 kg (9.15×10³ moles) of 85% aqueous $H_3PO_4$. The resulting slurry contained approximately 50.7% by weight solids, the mol percent of components on a dry basis was 31.5 mol percent CaO, 17.1 mol percent $Na_2O$, and 51.4 mol percent $P_2O_5$, and the CaO/$Na_2O$ mol ratio was 1.84.

(c) Crystalline Calcium Sodium Metaphosphate

The crystallization kiln described in Part (a) above was heated, while rotating at approximately 7 revolutions per minute (rpm), via the line burner to a temperature between about 680° C. and about 720° C. The maximum temperature was controlled by manipulation of the firing rate of the line burner based on readings from the four thermocouples in the thermocouple assembly. The wet mix slurry from Part (b) above was pumped via a metering pump to the feed-tube assembly and dispersed (in the form of droplets) at a constant volumetric rate onto the heated surface of the crystallization kiln shell at a rate sufficient to maintain the desired operating temperature. The overall dispersment was controlled via sequential opening of the solenoid valves associated with feed tubes F1–F7 which were numbered sequentially in relation to the corresponding numbered zones of the crystallization kiln shell as follows:

| Zone | Temperature | Feed Tube |
|------|-------------|-----------|
| Z1   | T1          | F1,F2     |
| Z2   | T2          | F3,F4     |
| Z3   | T3          | F4,F5     |
| Z4   | T4          | F6,F7     | such that at any given time only one feed tube was being supplied with wet mix slurry. The operating temperature profile T1–T4 of zones Z1–Z4, respectively, was maintained within 20° C. of one another by increasing the relative on-time of a feed tube associated with a hot zone and/or decreasing the relative on-time of a feed tube associated with a cool zone. During the initial period of operation, the wet mix slurry was dispersed onto the heated kiln shell wall, dried, and heated to a temperature of incipient fusion to form a protective ceramic-like shell lining of calcium sodium metaphosphate having a desirable thickness (as determined by the distance between the boring/scraper bar and the crystallization kiln shell inner wall which served to protect the stainless steel kiln shell wall from corrosion and to minimize heat loss through the kiln shell. Once the desirable kiln shell lining thickness—about 1.905 cm (0.75 in.) at its thinnest point [which corresponds to the apogee (peaks) of the notches of the notched side of the boring/scraper bar] and about 3.81 cm (1.5 in.) at its thickest point [which corresponds to the perigee (valleys) of the notches of the notched side of the boring/scraper bar]—was achieved, the boring/scraper bar continuously contacted the lining to bore and scrape grooves in the kiln shell lining to induce a rolling-tumbling action for the particulate material [maintained at the incipient fusion temperature (680° C.–720° C., usually averaging 685° C.–705° C.) separated from the kiln shell lining. Addition/dispersion of the wet mix slurry was continued over a 32-hour period to produce a total of 5.96×10² kg (1313.0 lb) of product crystals of calcium sodium metaphosphate at an average production rate of 18.6 kg/hr (41.0 lb/hr). The product crystals [once the threshold height of the 13.97 cm (5.5 in.) discharge chute was overcome] were continuously discharged from the crystallization kiln, (crystallization forming and growth zone) resulting in a mean residence time for the product crystals in the crystallization kiln of approximately 3.9 hr. The product crystals of calcium sodium metaphosphate had a CaO/$Na_2O$/$P_2O_5$ mol percent ratio of 32.46/17.14/50.40 and a CaO/$Na_2O$ mol ratio of 1.89.

(d) Asbestiform Crystalline Calcium Sodium Metaphosphate Fiber (1) Fiberization

The calcium sodium metaphosphate crystals from Part (c) above [following cooling to ambient (room) temperature] were fiberized into asbestiform crystalline calcium sodium metaphosphate fiber by dry milling in an air classification mill (Mikro-pul 1 ACM) at a rotor speed of 22,000 rpm, a separator speed of 10,000 rpm, and an air flow rate of 1.42 m³/min (50 ft³/min). The resulting fiber, which contained an average water soluble fraction (nominally considered to consist of non-crystallized calcium sodium metaphosphate glass) of 5.34% by weight, had an average aspect ratio of 83.2 and an average diameter of 1.98 $\mu$m, and an average surface area of 7.14×10³ cm²/g.

(2) Characterization

The asbestiform calcium sodium metaphosphate fiber from Part (d)(1) above was characterized as follows:

The average aspect ratio (length/diameter) was calculated using Equation (1)

$$\text{Aspect Ratio} \quad (L/D) = [(9.76 \cdot V + 72.0)^{0.5} - 11.5]/0.244 \quad (1)$$

wherein V is the packed volume (in cm³) of the asbestiform calcium sodium metaphosphate fiber, as determined using a Vanderkamp Tap Density Tester according to the standard operating instructions supplied by the manufacturer. The aspect ratio equation was derived via a quadratic least squares analysis of data presented by Milewski, *A Study of the Packing of Fibers and Spheres*, University Microfilms, Ann Arbor, 1973, p. 83 which correlates aspect ratio with bulk density.

The average fiber diameter was calculated using Equation (2)

$$\text{Equivalent Cylindrical Diameter} = (\omega) \text{ (Equivalent Spherical Diameter)} \quad (2)$$

wherein the equivalent spherical diameter was measured using a Fisher Sub-sieve Sizer according to standard operating instructions supplied by the manufacturer.

The average surface area was calculated from the equivalent spherical diameter using Equation (3)

$$S = 60,000/(d \cdot P) \quad (3)$$

wherein S is the surface area in cm²/g; d is the equivalent spherical diameter in $\mu$m; and P is the true density in g/cm³ as determined by mercury displacement using an Aminco-Winslow Porisimeter.

The water soluble fraction was determined by adding 4.0 g of asbestiform calcium sodium metaphosphate fiber to 200.0 g of water. The resulting mixture was heated, with agitation, to 90° C., which temperature was maintained for 30 minutes, cooled to ambient (room) temperature, and filtered through a 0.45 $\mu$m filter. The filtrate was analyzed for CaO, $Na_2O$, and $P_2O_5$ via a Technicon Autoanalyzer system according to standard operating instructions supplied by the manufacturer.

EXAMPLES 2-19

A number of batches of calcium sodium metaphosphate fiber were prepared using the crystallization kiln, procedure and conditions described in Example 1 above. The parameters for such fiber are set forth in Table 1 below.

long discharge chute at the other end and fitted with a 45.72 cm (18 in.) long gas-fired, water-cooled line burner containing two parallel rows of six flame nozzles spaced 5.08 cm (2 in.) apart, center-to-center, and having a maximum firing rate of $2.85 \times 10^8$ joules/hr (J/hr, $2.70 \times 10^5$ BTU/hr), a reciprocating water-cooled slurry feed tube, and a motor driven rotation drive.

(b) Wet Mix Slurry

TABLE 1

Wet Mix Slurry
Source Materials, kg, [(a) × $10^3$ mol], mol %[1]

| Ex. | CaO[2] | Na$_2$O[3] | P$_2$O$_5$[4] | CaO/Na$_2$O Mol Ratio | Water[5] kg | Solid Phase wt. % |
|---|---|---|---|---|---|---|
| 2 | 210.5(2.84),31.59 | 238.4(2.98),16.99 | 1045.7(9.070),51.42 | 1.86 | 174.4 | 53.4 |
| 3 | 213.0(2.88),31.54 | 238.4(2.98),17.04 | 1035.7(8.98),51.43 | 1.85 | 185.7 | 53.1 |
| 4 | 210.7(2.85),31.63 | 240.5(3.010),17.03 | 1020.7(8.85),51.34 | 1.86 | 214.4 | 52.0 |
| 5 | 213.5(2.89),31.53 | 246.0(3.075),17.27 | 1024.7(8.89),51.20 | 1.82 | 222.5 | 51.7 |
| 6 | 219.7(2.47),31.57 | 238.4(2.98),17.22 | 1047.2(9.083),51.20 | 1.83 | 265.2 | 50.7 |
| 7 | 211.9(2.86),31.60 | 242.4(3.030),17.19 | 1153.7(10.010),51.21 | 1.89 | 262.0 | 51.3 |
| 8 | 214.8(2.90),31.55 | 251.9(3.15),17.03 | 1229.7(10.67),51.42 | 1.85 | 325.8 | 50.1 |
| 9 | 215.0(2.90),31.60 | 242.0(3.025),16.93 | 1020.7(8.85),51.46 | 1.87 | 276.2 | 50.2 |
| 10 | 212.1(2.87),31.60 | 245.6(3.070),17.08 | 1020.7(8.85),51.40 | 1.85 | 213.0 | 52.0 |
| 11 | 227.0(3.068),31.57 | 238.4(2.98),16.99 | 1100.7(9.55),51.44 | 1.86 | 314.3 | 49.8 |
| 12 | 213.5(2.89),31.54 | 238.4(2.98),17.05 | 1055.5(9.15),51.41 | 1.85 | 174.9 | 51.6 |
| 13 | 216.5(2.93),31.53 | 241.4(3.018),16.98 | 1020.7(8.85),51.49 | 1.85 | 232.1 | 51.6 |
| 14 | 211.0(2.85),31.66 | 238.9(2.99),16.97 | 1029.2(8.93),51.38 | 1.85 | 352.2 | 48.1 |
| 15 | 214.5(2.90),31.51 | 238.4(2.98),17.01 | 1031.7(8.95),51.48 | 1.85 | 221.5 | 51.9 |
| 16 | 218.1(2.95),31.60 | 239.6(3.00),17.01 | 1040.7(9.026),51.39 | 1.86 | 209.9 | 52.3 |
| 17 | 204.7(2.77),31.53 | 238.4(2.98),16.99 | 1027.3(8.91),51.48 | 1.86 | 172.3 | 53.3 |
| 18 | 226.4(3.059),31.68 | 241.8(3.022),16.72 | 1095.1(9.50),51.61 | 1.89 | 353.5 | 48.7 |
| 19 | 159.6(2.16),26.67 | 163.9(2.049),13.33 | 1045.5(9.068),60.00 | 1.89 | 318.8 | 48.8 |

Calcium Sodium Metaphosphate, [CaNa(PO$_3$)$_3$]$_n$

| | Preparative Conditions | | Product Crystals Yield | | | | Fiber | | | |
|---|---|---|---|---|---|---|---|---|---|---|
| Ex. | Temperature °C.[6] | Feed Time hr | (b) × $10^3$ kg | % | CaO/Na$_2$O/P$_2$O$_5$ mol % Ratio[1] | CaO/Na$_2$O Mol Ratio | Aspect Ratio | Diameter μm | Surface Area (c) × $10^3$ cm$^2$/g | Wat. Sol Fraction wt. % |
| 2 | 685-705 | 33.6 | 7.71 | 86.52 | 32.03/17.21/50.76 | 1.86 | 61.3 | 2.93 | 6.35 | 7.04 |
| 3 | " | 38.3 | 6.60 | 74.32 | 31/43/17.54/51.03 | 1.79 | 48.4[7] | 6.69 | 2.11 | 4.76 |
| 4 | " | 25.1 | 6.54 | 74.60 | 32.39/17.36/50.25 | 1.87 | 57.6 | 2.04 | 6.93 | 8.09 |
| 5 | " | 30.2 | 7.28 | 82.51 | 32.23/17.35/50.42 | 1.86 | 54.3 | 2.12 | 6.67 | 8.41 |
| 6 | " | 33.4 | 3.42 | 38.020 | 32.02/17.52/50.46 | 1.83 | 63.9 | 1.85 | 7.63 | 8.62 |
| 7 | " | 29.2 | 4.54 | 47.26 | 32.42/17.13/50.45 | 1.89 | 65.4 | 2.05 | 6.88 | 8.07 |
| 8 | " | 43.0 | 7.10 | 70.12 | 31.62/17.64/50.74 | 1.79 | 65.1 | 1.37 | 10.30 | 11.86 |
| 9 | " | 37.5 | 5.40 | 61.34 | 32.25/17.29/50.46 | 1.87 | 64.8 | 1.93 | 7.31 | 7.68 |
| 10 | " | 32.8 | 5.72 | 65.058 | 31.90/17.55/50.55 | 1.82 | 63.8 | 1.97 | 7.16 | 6.98 |
| 11 | " | 39.7 | 6.90 | 73.66 | 32.13/17.51/50.36 | 1.83 | 61.1 | 1.97 | 7.16 | 7.55 |
| 12 | " | 32.4 | 5.96 | 66.26 | 32.15/17.41/50.45 | 1.85 | 57.9 | 1.95 | 7.26 | 8.05 |
| 13 | " | 38.1 | 7.13 | 80.95 | 32.22/17.25/50.53 | 1.87 | 62.1 | 1.87 | 7.57 | 7.10 |
| 14 | " | 39.5 | 6.12 | 69.45 | 32.14/17.42/50.44 | 1.85 | 61.2 | 1.87 | 7.57 | 7.54 |
| 15 | " | 32.6 | 6.65 | 75.14 | 32.12/17.35/50.54 | 1.85 | 60.3 | 1.76 | 8.03 | 7.68 |
| 16 | " | 32.2 | 6.59 | 73.75 | 32.27/17.25/50.48 | 1.87 | 58.0 | 1.53 | 9.22 | 6.69 |
| 17 | " | 40.3 | 7.31 | 83.56 | 32.26/17.29/50.44 | 1.87 | 57.5 | 1.85 | 7.63 | 6.83 |
| 18 | " | 34.4 | 5.73 | 61.33 | 32.13/17.00/50.87 | 1.89 | 59.1 | 1.95 | 7.26 | 8.67 |
| 19 | 550-570 | 24.1 | 2.74 | 33.24 | 31.23/15.87/52.90 | 1.97 | 67.3 | 2.03 | 6.97 | 8.86 |

[1]Analyzed using a Technicon Antoanalyzer system according to standard operating instructions supplied by the manufacturer.
[2]As Calcium hydroxide, Ca(OH)$_2$.
[3]As sodium hydroxide, NaOH, 50% by weight aqueous solution.
[4]As orthophosphoric acid, H$_3$PO$_4$, 85% by weight aqueous solution.
[5]Added as free water to maintain an even consistency.
[6]Average temperature.
[7]The calcium sodium metaphosphate product crystals were pulverized by dry milling in an air classification mill (Miko-pul 10 ACM) with a rotor speed of 6,000 rpm, a separator speed of 750 rpm, and an air flow rate of 11.3 m$^3$/min (400 ft$^3$/min).

EXAMPLE 20

(a) Crystallization Kiln

A crystallization kiln was constructed from a 60.96 cm (24 in.) inside diameter × 48.26 cm (19 in.) long stainless steel tube, including a 12.70 cm (5 in.) long × 15.24 cm (6 in.) high discharge chute at one end thereof, having its longitudinal axis oriented along a substantially horizontal line and having a centrally located 15.74 cm (6 in.) circular opening in one end and the previously noted 15.24 cm (6 in.) high × 12.70 cm (5 in.)

To a solution of 180.9 kg ($2.26 \times 10^3$ moles) of 50% by weight aqueous NaOH and 240.9 kg ($1.34 \times 10^4$ moles) of water (H$_2$O) contained in a 600 l stainless steel recirculating slurry tank was added, with stirring and recirculation, 161.4 kg ($2.12 \times 10^3$ moles) of Ca(OH)$_2$ to yield a homogeneous slurry. The slurry was thereafter added, with stirring and recirculation, to 787.0 kg ($6.83 \times 10^3$ moles) of 85% aqueous H$_3$PO$_4$ contained in a 1300 l stainless steel tank fitted with circulating water cooled coils at a rate sufficient to maintain the temperature between 40° C. and 95° C. The resulting slurry contained approximately 49% by weight solids, the mol percent of components on a dry basis was 31.6 mol percent CaO, 17.2 mol percent $Na_2O$, and 51.2 mol percent $P_2O_5$, and the $CaO/Na_2O$ mol ratio was 1.84.

(c) Crystalline Calcium Sodium Metaphosphate

The crystallization kiln from Part (a) above was charged with 47.17 kg (104 lb) of crystalline calcium sodium metaphosphate having a particle size less than 8 mesh (U.S. Standard Sieve Size, 2.36 mm) and larger than 30 mesh (600 μm), also expressed as −8+ or 8/30 mesh, to provide a bed depth of 15.24 cm (6 in.), and heated, while rotating, with the line burner to an average temperature from about 681° C. to about 712° C. to induce incipient fusion of the crystal bed.

A portion of the wet mix slurry from Part (b) above (672.4 kg, 1482.3 lb) was pumped via a metering pump to the reciprocating feed tube and dispersed onto the heated bed of calcium sodium metaphosphate crystals over a 59.3-hr period at a rate sufficient to maintain the bed temperature. A total of 552.1 kg (1217.1 lb) of calcium sodium metaphosphate crystals having the appearance of blocks and a size generally ranging from about 200 μm to about 400 μm was collected—457.7 kg (1009.1 lb) as discharge from the crystallization kiln (crystal formation and growth zone) and 94.3 kg (208.0 lb) as residue remaining in the crystallization kiln—plus an additional 79.7 kg (175.7 lb) as blowout from the crystallization kiln. The latter material, which was collected either as a slurry in an off gas scrubber or as solids in the crystallization kiln off-gas ductwork, was used as recycle for subsequent runs. The former material had an average $CaO/Na_2O/P_2O_5$ mol percent ratio of 32.68/16.93/50.39 and a $CaO/Na_2O$ mol ratio of 1.93.

(d) Asbestiform Crystalline Calcium Sodium Metaphosphate Fiber

The calcium sodium metaphosphate crystals from Part (c) above were fiberized into asbestiform crystalline calcium sodium metaphosphate fiber by dry milling in an air classification mill (Mikro-pul 10 ACM) at a rotor speed of 7,000 rpm, a separator speed of 3,500 rpm, and an air flow rate of 11.3 m³/min (400 ft³/min). The resulting fiber was characterized as described in Example 1(d)(2) above by an average aspect ratio of 64.0, an average diameter of 1.98 μm, an average surface area of $7.15 \times 10^3$ cm²/g, and an average water soluble fraction of 7.32% by weight.

Thus, it is apparent that there has been provided, in accordance with the instant invention, a process for the preparation of asbestiform crystalline calcium sodium metaphosphate fiber that fully satisfies the objects and advantages set forth hereinabove. While the invention has been described with respect to various specific examples and embodiments thereof, it is understood that the invention is not limited thereto and that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A process for the preparation of asbestiform crystalline calcium sodium metaphosphate fiber, which process comprises:
   (a) bringing together in aqueous media source materials for CaO, $Na_2O$, and $P_2O_5$ in proportions sufficient to provide a $CaO/Na_2O/P_2O_5$ mol percent ratio on a dry basis of about 24.0–34.0/12.0–18.0/50.0–60.0, with the proviso that the $CaO/Na_2O$ mol ratio is from about 1.60 to about 2.00, and form a wet mix slurry containing a solid phase and an aqueous liquid phase;
   (b) dispersing the wet mix slurry onto substrate calcium sodium metaphosphate crystals in a crystal formation and growth zone under conditions sufficient to remove the aqueous liquid phase and deposit the solid phase onto the substrate crystals and cause identically oriented continuous crystal formation and growth between the solid phase deposit and the substrate crystals to thereby form product crystals of calcium sodium metaphosphate; and
   (c) fiberizing the product crystals of calcium sodium metaphosphate into asbestiform crystalline calcium sodium metaphosphate fiber.

2. The process of claim 1 wherein the source materials for each of CaO, $Na_2O$, and $P_2O_5$, respectively, is calcium hydroxide, sodium hydroxide, and a phosphoric acid.

3. The process of claim 2 wherein the phosphoric acid is orthophosphoric acid.

4. The process of claim 3 wherein the orthophosphoric acid is an 85% by weight aqueous solution.

5. The process of claim 1 wherein the $CaO/Na_2O/P_2O_5$ mol percent ratio is about 29.0–34.0/16.0–8.0/50.0–53.0 and the $CaO/Na_2O$ mol ratio is from about 1.80 to about 2.00.

6. The process of claim 5 wherein the $CaO/Na_2O/P_2O_5$ mol percent ratio is about 30.0–33.0/16.5–17.5/50.5–52.5

7. The process of claim 1 wherein the solid phase of the wet mix slurry comprises from about 40% to about 70% by weight thereof.

8. The process of claim 7 wherein the solid phase of the wet mix slurry comprises from about 45% to about 55% by weight thereof.

9. The process of claim 1 wherein the wet mix slurry is maintained in step (a) at a temperature from about 40° C. to about 95° C.

10. The process of claim 1 wherein the crystal formation and growth zone is maintained at a temperature from about 550° C. to about 720° C.

11. The process of claim 10 wherein the temperature is from about 685° C. to about 705° C.

12. The process of claim 1 wherein the product crystals of calcium sodium metaphosphate have a residence time in the crystal formation and growth zone from about 3 hours to about 15 hours.

13. The process of claim 12 wherein the residence time is from about 3.5 hours to about 4.5 hours.

14. The process of claim 1 wherein the product crystals of calcium sodium metaphosphate are fiberized by a process selected from grinding, crushing, levigating, triturating, and milling.

15. The process of claim 14 wherein the fiberization is effected by milling.

16. The process of claim 15 wherein the milling is carried out by dry milling in an air classification mill.

17. The process of claim 1 wherein the product crystals of calcium sodium metaphosphate possess a $CaO/Na_2O/P_2O_5$ mol percent ratio from about 32.30–32.70/16.90–17.20/50.25–50.60 and a $Ca/Na_2O$ mol ratio from about 1.80 to abut 2.00.

18. The process of claim 1 wherein the asbestiform crystalline calcium sodium metaphosphate fiber exhibits an average aspect ratio of at least 10 and an average diameter in the range from about 0.5 μm to about 20 μm.

* * * * *

UNITED STATES PATENT AND TRADEMARK OFFICE
CERTIFICATE OF CORRECTION

PATENT NO. : 4,717,487

DATED : 1/5/88

INVENTOR(S) : Edward J. Griffith et al

It is certified that error appears in the above-identified patent and that said Letters Patent are hereby corrected as shown below:

Col. 4, line 38, delete "Caloium" and insert --Calcium--.

Col. 10, line 45, delete "($\omega$)" and insert --(2/3)--.

Signed and Sealed this

Twenty-third Day of August, 1988

Attest:

DONALD J. QUIGG

Attesting Officer

Commissioner of Patents and Trademarks